(12) United States Patent
Lukac et al.

(10) Patent No.: US 11,017,511 B2
(45) Date of Patent: May 25, 2021

(54) METHOD AND SYSTEM OF HAZE REDUCTION FOR IMAGE PROCESSING

(71) Applicant: Intel Corporation, Santa Clara, CA (US)

(72) Inventors: Rastislav Lukac, San Jose, CA (US); Chihiro Tajima, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 16/275,208

(22) Filed: Feb. 13, 2019

(65) Prior Publication Data
US 2019/0180423 A1   Jun. 13, 2019

(51) Int. Cl.
*G06T 5/40*   (2006.01)
*G06T 5/00*   (2006.01)
*G06T 5/20*   (2006.01)

(52) U.S. Cl.
CPC .............. *G06T 5/009* (2013.01); *G06T 5/002* (2013.01); *G06T 5/007* (2013.01); *G06T 5/20* (2013.01); *G06T 5/40* (2013.01); *G06T 2207/10004* (2013.01); *G06T 2207/10016* (2013.01); *G06T 2207/10024* (2013.01); *G06T 2207/20004* (2013.01); *G06T 2207/20021* (2013.01); *G06T 2207/20208* (2013.01)

(58) Field of Classification Search
CPC ......... G06T 5/009; G06T 5/007; G06T 5/002; G06T 5/20; G06T 2207/10016; G06T 2207/10024; G06T 2207/10004; G06T 2207/20208; G06T 2207/20004; G06T 2207/20021
USPC ....... 382/100, 254, 274, 260, 261, 165, 166, 382/167, 190, 300, 309, 172, 173, 174, 382/218, 219, 220; 348/43, 243, 571, 348/687, 607, 61, 122, 143
See application file for complete search history.

(56) References Cited

U.S. PATENT DOCUMENTS

| | | | |
|---|---|---|---|
| 9,659,237 B2 * | 5/2017 | Puetter | G06T 7/90 |
| 10,692,197 B2 * | 6/2020 | Shah | G06K 9/00744 |
| 2011/0043603 A1 * | 2/2011 | Schechner | G06T 5/003 |
| | | | 348/25 |

* cited by examiner

*Primary Examiner* — Sheela C Chawan
(74) *Attorney, Agent, or Firm* — Green, Howard & Mughal LLP.

(57) ABSTRACT

A method, system, and article are directed to haze reduction for image processing.

23 Claims, 10 Drawing Sheets

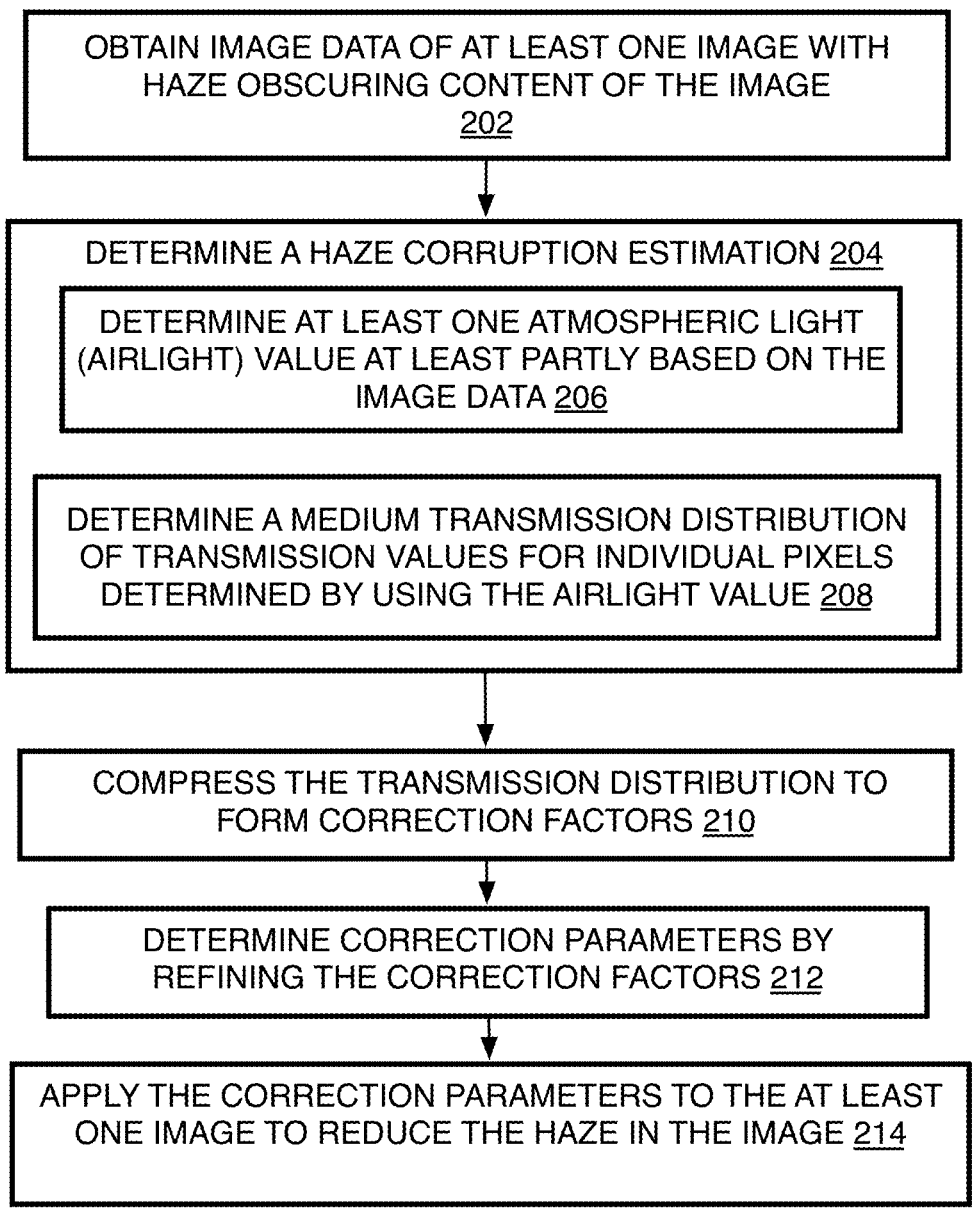

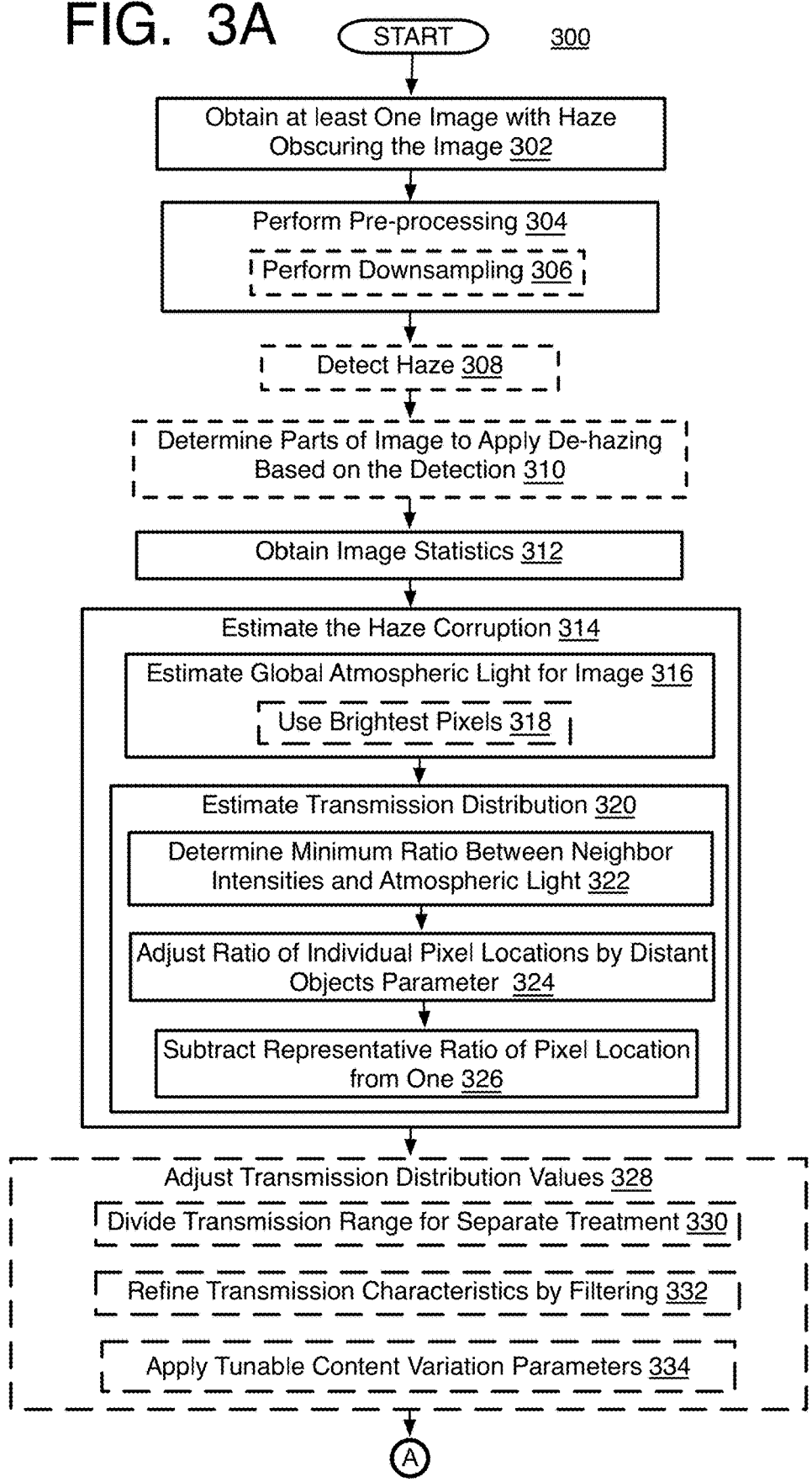

Compress and Extract Features to Generate Correction Factors 336

OPTION 1: LUT
- Divide Signal Range of Image Data Values into Segments 338
- Determine Representative Transmission for Individual Segments to form LUT 339
  - Apply Parameterized Curve to Representative Transmissions 340
- Apply Smoothing Filter 341
- Provide the LUT as the Correction Factors 342

OPTION 2: Curve Fit
- Normalize Transmission Values by Dividing by Luminance Vales 344
- Apply Curve Fitting Function to form Parameterized Curve 346
- Provide Par. Curve as the Correction Factors 348
- Sample Par. Curve to form a Table of Correction Factors 350

Generate Correction Parameters 352
- Temporally Filter Correction Factors for LUT 354
- Temporally Filter Correction Factors for the Parameterized Curve 353
- Interpolate Values for Empty Bins 356
- Apply Filter for Smoothing 358

(A) → (B)

 
FIG. 5A 500   FIG. 5B 502

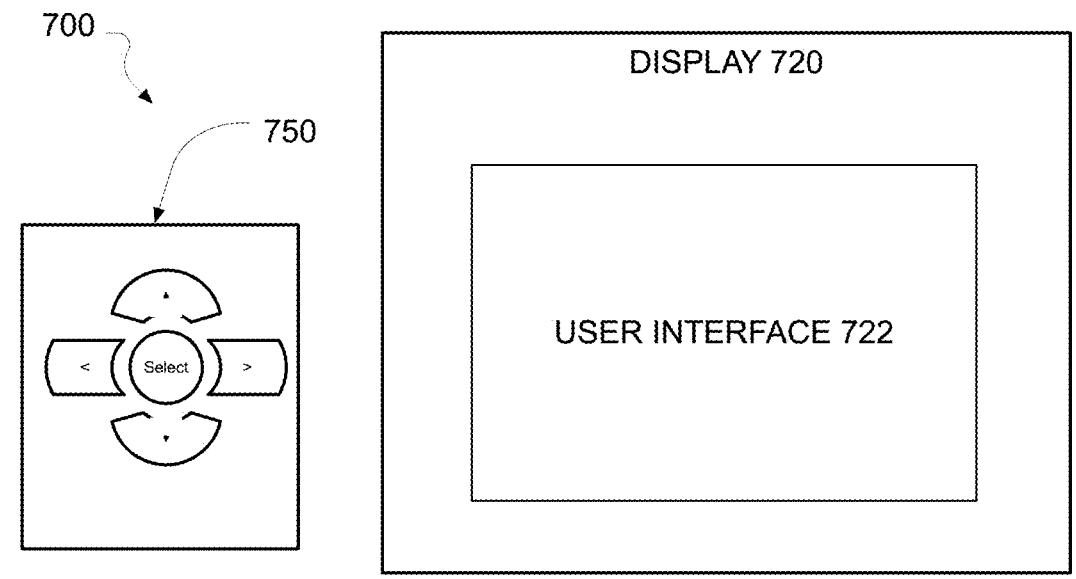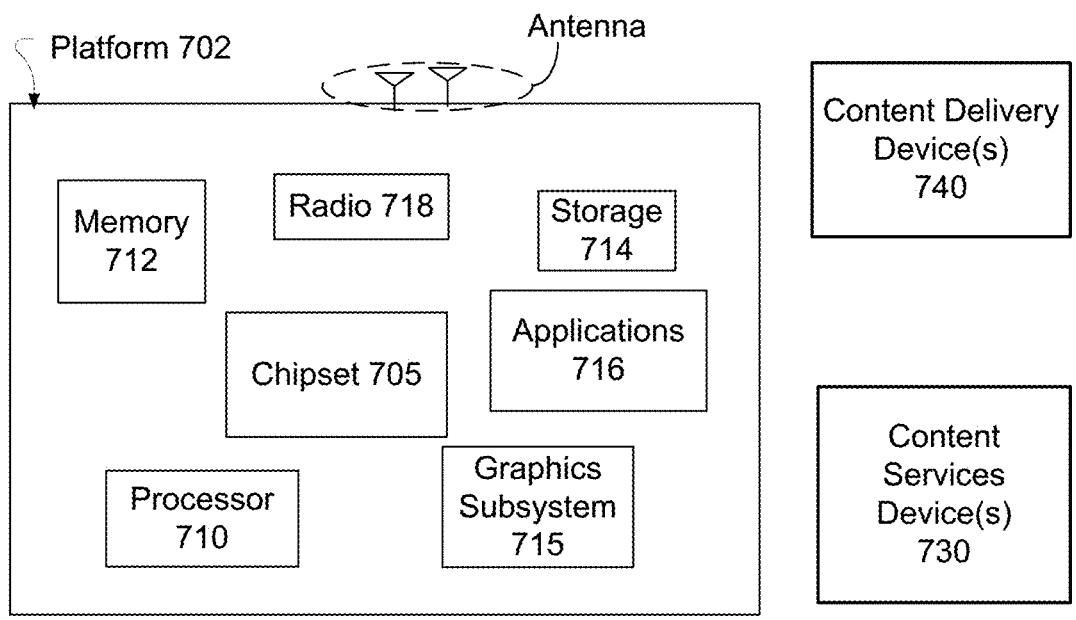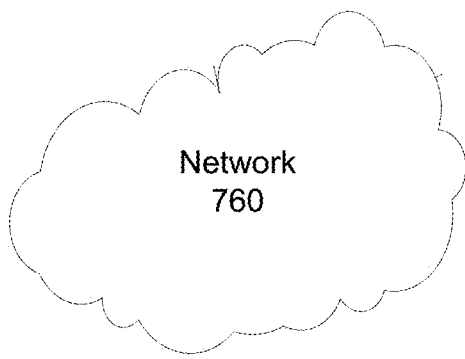
FIG. 7

METHOD AND SYSTEM OF HAZE REDUCTION FOR IMAGE PROCESSING

BACKGROUND

A number of high quality camera systems, such as automotive, drone, and security vision systems, are expected to reliably operate in a wide range of lighting and weather conditions for many tasks such as visual inspection and/or computer related analysis, such as object detection, recognition, and/or tracking. However, the presence of haze significantly limits performance of these systems and degrades the information value of captured images. Haze is a slight obscuration of the lower atmosphere, typically caused by fine suspended particles, which may include fog, mist, cloud, smog, smoke, and so forth. Large atmospheric particles, typical for hazy weather, absorb and disperse the reflected light of a scene and also scatter some atmospheric light to a camera, resulting in images with low contrast and poor visibility. The conventional methods for removing haze and similar effects that cloud an image are often computationally expensive, and/or memory consuming, thus being unsuitable for implementation in various camera imaging and image processing systems. These conventional methods also may be difficult to tune and control, which can affect an image unevenly and result in artifacts in the output images and video.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart of a method of haze reduction for image processing in accordance with at least one of the implementations herein;

FIGS. 3A-3C is a detailed flow chart of a method of haze reduction for image processing in accordance with at least one of the implementations herein;

FIG. 5A is an image of a laboratory scene with degradation caused by haze using an optical fog filter;

FIG. 5B is an image with the same content of FIG. 5A de-hazed by using the image processing method in accordance with at least some implementations of the present disclosure;

FIG. 7 is an illustrative diagram of an example system; and

DETAILED DESCRIPTION

Figure 1:
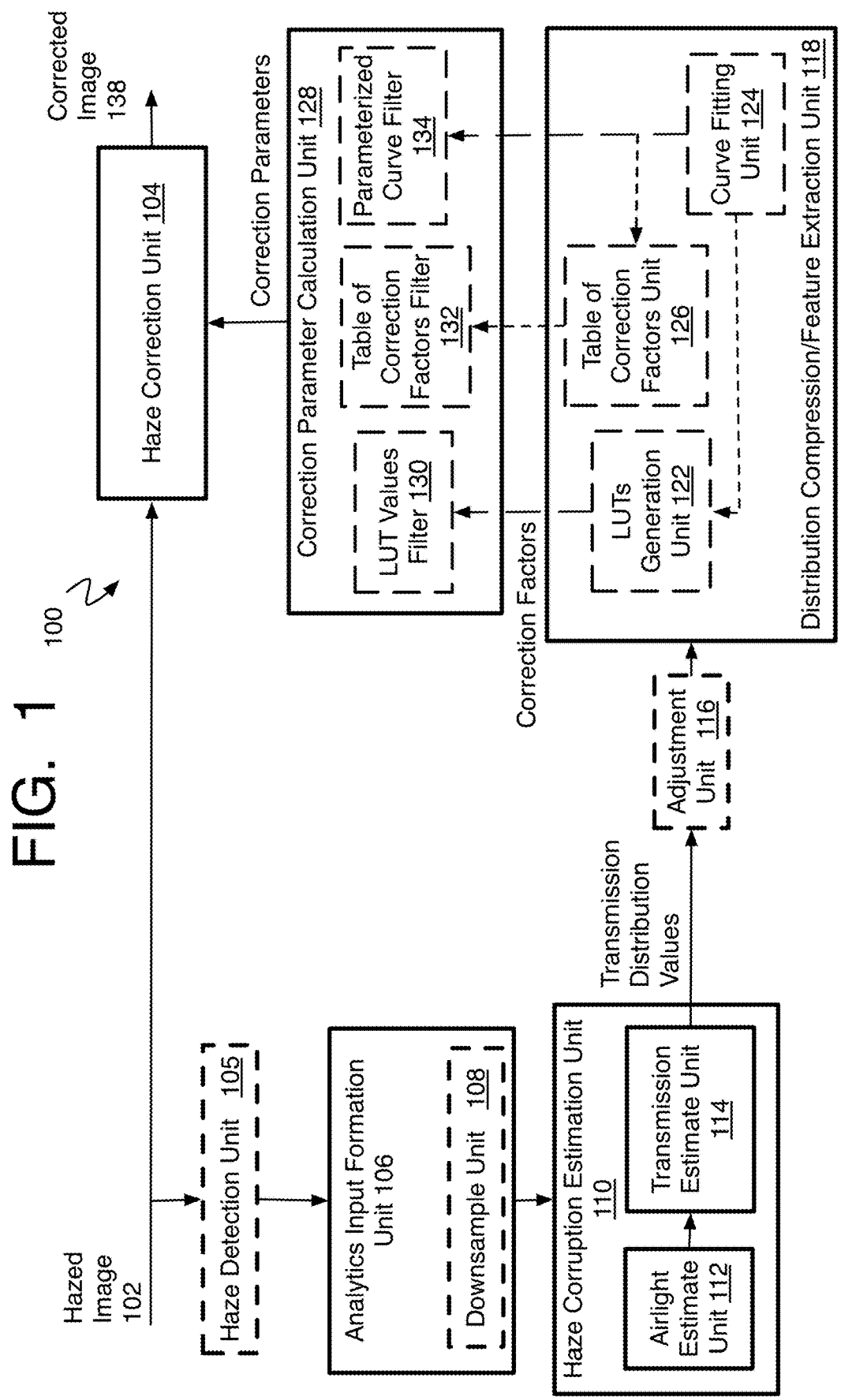
FIG. 1 is a schematic diagram of an image processing device in accordance with at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes unless specifically described and limited herein. For instance, various architectures employing, for example, multiple integrated circuit (IC) chips and/or packages, image signal processors (ISPs), digital signal processors (DSPs), graphics processing units (GPUs), and/or various computing devices and/or consumer electronic (CE) devices such as digital cameras, dedicated cameras, multi-purpose computing devices with one or more cameras, set top boxes, smartphones, laptop computers, tablets, televisions, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein also may be implemented as instructions stored on a machine-readable medium, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of haze reduction for image processing are described herein.

As mentioned, the presence of haze, including fog for example, in video and/or still images degrades image quality by causing low contrast and poor visibility. For camera imaging systems, such as for vehicle safety or video surveillance systems, which are expected to reliably operate in a wide range of lighting and weather conditions, the presence of haze significantly and unacceptably limits performance and makes the image or video based analysis more difficult if not impossible. Such images need to be enhanced to reduce these undesired effects, prior to using the images for visual inspection or video based analysis, such as object detection, recognition, and tracking. Since light source and captured scenes are usually unknown in many camera settings, modelling degradations to estimate a correction in order to suppress haze is very important. On the other hand, the systems for automotive, drone, and surveillance cameras, for example, usually have various strict requirements related to video quality, low latency, small power and memory consumption, image resolution, frame rates, and so on, which are difficult to meet by implementing the conventional de-hazing methods.

The conventional methods to reduce haze either provide poor quality images or undesired artifacts, or have performance issues, such as being too slow, too computationally heavy, too expensive, and otherwise inefficient. For example, some methods may be based on histogram equalization which is computationally efficient but does not produce the desired correction effect in more complex scenes and/or lighting conditions. To improve the haze reduction, physical model-based methods have been proposed. In a method using a dark channel prior, the thickness of haze is estimated, and then haze-free images are restored by an atmospheric scattering model. Although the approach is rather simple, artifacts like halos still can be observed depending on the scene. Some other algorithms have been proposed to improve the image quality, for instance, by employing median, bilateral, or guided image filtering. Other methods based on image regularization or a color attenuation prior for still images have also been proposed.

Spatially adaptive approaches rely on the relative positions of pixel locations such that a pixel location to the right of a center pixel may have a different weight than the pixel location to the diagonally lower position relative to a center pixel in a local neighborhood of pixels when determining correction coefficients. Such spatially adaptive and/or physics based approaches for image de-hazing are usually too complex, computationally expensive, and memory consuming for real time video processing. Therefore, the processing should be constrained somehow in order to provide feasible processes for practical implementations with real life applications and certain system requirements. This is typically done by calculating correction coefficients per block of pixels in the input image rather than doing expensive calculations in each pixel location and/or simplifying spatial processing at the cost of creating various artifacts, such as halos, aliasing, and ringing artifacts. Moreover, spatially-adaptive solutions are often difficult to tune and control, which results in uneven correction effects across the image, excessive correction, unnatural colors, and various temporal artifacts and fluctuations in pixel values when applied to video.

To resolve these issues, a method and system disclosed herein obtain the haze correction capabilities through a tone mapping type of adjustment that provides a transfer or conversion from input image data to output corrected image data with reduced haze. The estimated transmission data is subject to feature analysis in order to efficiently compress and represent a haze correction distribution as a tone-mapping type of curve using a mathematical function, approximation, or look-up table (LUT). Thus, in any given pixel location, the actual correction coefficients are obtained as a function of the input pixel value or some other signal-dependent component extracted from the input pixel value. The proposed method achieves similar correction effect compared to existing spatially adaptive methods, while avoiding creation of various artifacts and uneven correction effects across the image. Also, the curve is formed automatically using statistics collected for each image or video frame such that manual tone curve setting may be excluded and is unnecessary. Further, since the proposed method collects statistics to determine the best curve for haze removal from intermediate images, it can adapt to changes in image data made by preceding processing operations such that pre-processing is not limited in order to perform the de-hazing method herein. Moreover, since the proposed method is spatially invariant, as it uses global statistics, image characteristics, and/or features to determine the correction coefficients, motion from frame to frame is not a factor, and the method can be equally applied to still images and video, and still operate in real time (or near real time).

The proposed method has similar haze suppression capabilities as spatially adaptive methods, however, this is achieved at much lower computational and memory costs. The method is compatible with existing hardware and software imaging pipelines for real time processing. The method also is implementation friendly, easy to tune and control, and suitable for video, as it allows temporal smoothing of correction parameters. Since the method produces correction parameters in a format fully compatible with typical tone-mapping implementations, it saves hardware and firmware design and validation effort. The de-hazing method can be used as a stand-alone solution such that the camera image processing chain may be applied separately, or the camera characteristics may be unknown. The method also may be implemented as part of a tone mapping estimation suite or integrated in the camera imaging and image processing chains through unique combinations of the techniques described herein.

Referring now to FIG. 1, an image processing system 100 is provided to operate the method of haze reduction for image processing disclosed herein. The processing flow starts with creating suitable data for corruption analysis, which is then used to estimate degradations due to haze present in the scene. The obtained distribution is subject to compression and extraction of the luminance or some other suitable signal-dependent component in order to obtain correction parameters represented as a tone-mapping curve. Finally, these correction parameters are applied to the original input image to produce an output image with suppressed haze effects.

More particularly, the image processing system 100 may receive original hazed images 102 or images in various states depending on which pre-processing techniques have been applied to the image data, some of which are mentioned below. The images 102 may be single still photos or frames of a video sequence. The image data of the image 102 then may be provided to a Haze Correction Unit 104 that will apply correction parameters once computed and to units for computing these parameters in the first place. Optionally, a haze detection unit 105 may be provided to activate the haze reduction process or to determine which parts of an image are to receive de-hazing treatment based on user selection or some automatic criteria related to image histogram and contrast evaluation. An Analytics Input Formation Unit 106 provides the image data statistics, whether pixel luminance values or other image representation, for generating the haze correction parameters. This process may include a downsampling unit 108 to reduce the amount of image data to be processed for de-hazing to achieve greater efficiency.

A Haze Corruption Estimation unit 110 determines a haze corruption with an Airlight Estimate Unit 112 that generates global atmospheric light (airlight) values used by a Transmission Estimation Unit 114 to determine a distribution of transmission characteristics or values that can be used to form a function or mapping curve of the haze corruption or degradation. An optional Adjustment Unit 116 may adjust, smooth, or otherwise refine the transmission values. A Distribution Compression/Feature Extraction Unit 118 then compresses the transmission data and forms correction factors to represent, or be, the haze correction curve. This may be in the form of a look-up table (LUT) formed by an LUTs Generation Unit 122, a table of correction factors (TOCF) formed by a Table of Correction Factors Unit 126, or a parameterized curve formed by a Curve Fitting Unit 124. The parameterized curve may be used directly to form correction parameters, or may be sampled to form the table of correction factors and/or the LUT for efficient input-to-output mapping.

A Correction Parameters Calculation Unit 128 receives the correction factors in one of the three forms, or another form, and has filters to modify or refine the correction factors into correction parameters. Thus, a LUT Values Filter 130, a Table of Correction Factors Filter 132, and a Parameterized Curve Filter 134 temporally filter the LUT values, correction factors, and curve values respectively to avoid artifacts caused from movement of data from image to image or frame to frame. The LUT Values Filter 130 also may provide filters for smoothing of the LUT data in addition to the temporal filtering. A Table of Correction Factors Filter 132 also provides smoothing of the data. The Haze Correction Unit 104 then applies the correction parameters to the original version (or last received version) of the image data to reduce the haze in the image, and thereby providing a Corrected Image 138. More details for these operations are provided below.

Referring to FIG. 2, an example process 200 for haze reduction for image processing described herein is arranged in accordance with at least some implementations of the present disclosure. In the illustrated implementation, process 200 may include one or more operations, functions or actions as illustrated by one or more of operations 202 to 214 numbered evenly. By way of non-limiting example, process 200 will be described herein with reference to any of the example image processing systems described herein and where relevant.

Process 200 may include "obtain image data of at least one image with haze obscuring content of the image" 202, and particularly, this may include receiving the chroma and luminance pixel values of the image, Red-Green-Blue (RGB) color image, or the image in the Bayer color filter array (CFA) format. Herein, receiving the image data also may include receiving raw image data and performing pre-processing operations sufficient to perform the haze reduction as described below. This also may include obtaining statistics of the image that are used by the haze reduction process when needed.

Process 200 may include "determine a haze corruption estimation" 204, and this operation may comprise "determine at least one atmospheric light (airlight) value at least partly based on the image data" 206, and "determine a medium transmission distribution of transmission values for individual pixels by using the airlight value" 208. This is described in detail below, and results in a distribution of transmission characteristics or values, also referred to herein as the transmission distribution.

Process 200 may include "compress the transmission distribution to form correction factors" 210. The correction factors may be in the form of a look-up table (LUT), a parameterized curve formed by curve fitting, or a table of correction factors formed by using data of the parameterized curve. The data of the parameterized curve also may be used to obtain the values in the LUT. The details are provided below.

Process 200 may include "determine correction parameters by refining the correction factors" 212. This may involve temporal filtering of the LUT, table of correction factors, and parameterized curve to reduce the effect of motion that can cause various data and estimated parameter oscillations or abrupt changes from frame to frame in a video sequence. Alternatively, a smoothing filter may be applied to the table of correction factors and/or LUT values. The details are provided below.

Process 200 may include "apply the correction parameters to reduce haze in the at least one image" 214, and where the refined LUT, parameterized curve, and table of correction factors are applied to pixel locations of the image, pixel by pixel, and applied to the high resolution, or normal, image even when the correction parameters are based on a downsampled version of the image. The correction may be applied to only those parts of the image with detected haze when such detection is performed, or otherwise to the entire image. Other details are provided below.

One effect of the transmission being pixel-based without reliance on specific relative pixel locations (or in other words, spatially invariant) is that this analysis is less complex and more efficient than the spatially adaptive algorithms that track locations of neighbor pixels relative to each other (an upper pixel may have different weight than a side pixel in a 3×3 local neighborhood for example). Importantly, the spatially-invariant operations permit the de-hazing to be performed for video in real time (or near real time), and is not limited by motion of pixel data in the frames or images.

Figure 3C:
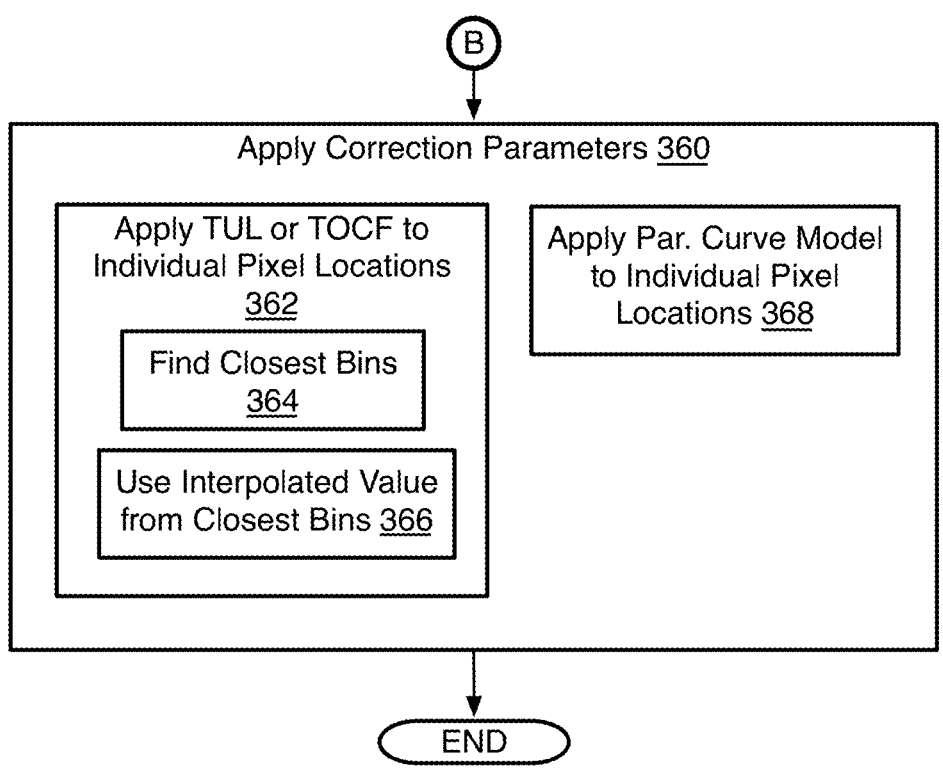

Referring to FIGS. 3A-3C, an example process 300 for haze reduction for image processing described herein is arranged in accordance with at least some implementations of the present disclosure. In the illustrated implementation, process 300 may include one or more operations, functions or actions as illustrated by one or more of operations 302 to 368 generally numbered evenly. By way of non-limiting example, process 300 will be described herein with reference to any of the example image processing systems described herein and where relevant.

Process 300 may include "obtain at least one image with haze obscuring the image" 302, and this is already described above with process 200 and systems 100 and 300. As mentioned, either still photos or frames of a video sequence may be obtained. The image data may be received as YUV color space values to provide luminance pixel values, but other data or signal representations could be used whether RGB color values, grayscales, or other color scales of various color filter arrays or other mechanisms used for capturing images. The images may be obtained from image capture buffers or from memory as transmitted to the device.

Process 300 may include "perform pre-processing" 304, which includes at least pre-processing necessary or sufficient for performing the haze reduction. This may include demosaicing, noise reduction, color space conversion, and so forth. The pre-processing also may include other desired image data treatments such as black level correction, data linearization, vignette reduction, defective pixel correction, white balance, HDR stitching, lens shading correction, brightness adjustment, and so forth. The haze reduction is not limited by such pre-processing or image modification of an original image, and may be performed upon many different versions or forms of the image as long as representative pixel-level image data can be obtained.

Optionally, process 300 may include "perform downsampling" 306, to reduce the computational load and raise efficiency by operating at a lower resolution. As described below, despite the low resolution, the resulting correction parameters, such as the LUT, may be applied to the high resolution image data to remove or reduce the haze.

Also optionally, process 300 may include "detect haze" 308, and this may be performed by known statistics and atmospheric scattering model analysis techniques or determined by the user such as by selecting an area by bounding box on a screen as one example. This process may indicate whether an image does or does not have haze and should be provided to the haze reduction units, or could be used to determine specifically which parts of an image have haze. In the latter case, process 300 may include "determine parts of image to apply de-hazing based on the detection" 310, rather than applying the de-hazing to the entire frame in order to increase speed and efficiency. This and other reasons, such as other image quality indicators, could be used to automatically or manually select one or more areas of the image or frame that is less than an entire frame for application of the de-hazing.

Process 300 then may include "obtain image statistics" 312, and particularly obtain the statistics, or the image data values, to be used to estimate the haze corruption. In the example used herein, pixel luminance data will be used but other representation of the data, or signal-dependent component, may be used such as the weighted average (including the mean, maximum, minimum, or selection) of Red, Green, and Blue pixel values, as well.

Process 300 may include "estimate the haze corruption" 314, and is performed by using a haze degradation model. The observed signal (or image data) of a captured image in the presence of haze can be modeled by:

$$I(x)=J(x)t(x)+A(1-t(x)) \quad (1)$$

where I(x) is the observed signal intensity, J(x) is the scene radiance, x is pixel position in the image, A is the global atmospheric light (airlight), and t(x) is the medium transmission where the term medium here refers to the substance or material intervening between a light source and an object in the path of the light. The goal of haze removal is to recover J from I, while estimating A and t using the available input data. Another way to say this is that determining the haze corruption comprises using observed intensity of the image data and estimates of the airlight and the transmission values to obtain a function of scene radiance for a given input image.

The process of determining the correction function and/or correction parameters can use the image data with reduced resolution through downsampling for higher efficiency. The downsampling is possible because, globally, the mapping from the scene radiance J to the captured signal I does not change much, if at all, with the sensor resolution. By assuming that haze effect is spatially and temporally smooth enough, the mapping from I to J can be expressed as pixel value dependent only.

Process 300 may include "estimate global atmospheric light for image" 316, and in order to estimate the atmospheric light (airlight) A, the proposed corruption estimation process seeks the darkest pixels since they are usually least affected by degradations. Thus, process 300 may include "use darkest pixels" 318. In one example implementation, a predetermined number (two for example) of pixels with lowest intensities in each designated local neighborhood in the input image are selected, and such extracted pixels are then further combined (e.g., weighted averaging) to obtain the image airlight A. In another example implementation, A is calculated by averaging several darkest pixels in the input image. Otherwise, generally, the airlight A can be a combination of airlight estimates from one or more areas of the image being analyzed.

Process 300 may include "estimate transmission distribution" 320. Namely, this process may include "determine minimum ratio between neighbor intensities and atmospheric light" 322, and particularly, by finding the minimum ratio between pixel intensities inside the neighborhood centered at a pixel location and the atmospheric light. Stated another way, by making a reasonable assumption that the transmission in a local neighborhood is constant, the haze imaging model can be transformed as:

$$\min_{X \in \Omega(x)} \left( \frac{I(X)}{A} \right) = t(x) \left( \min_{X \in \Omega(x)} \left( \frac{J(X)}{A} \right) \right) + 1 - t(x) \quad (2)$$

where t(x) is the patch medium transmission, and Ω(x) is a local patch or neighborhood centered at the pixel location x. Since A is always positive and according to the dark channel prior, the haze-free image J tends to be zero or close to zero except for the brighter regions, such as sky regions, the transmission can be extracted simply by:

$$t(x) = 1 - \omega \cdot \left( \min_{X \in \Omega(x)} \left( \frac{I(X)}{A} \right) \right) \quad (3)$$

where a constant parameter ω(0<ω<1) is used. Thus, process 300 may also include "adjust ratio of individual pixel locations by distant objects parameter" 324 by multiplying the ratio with the parameter to keep a small amount of haze for distant objects since the atmosphere is not completely free of particles even in clear weather. Additionally, process 300 may include "subtract representative ratio of pixel location from one" 326, or in other words, subtracting the intermediate (versus final) result from one.

By one form, the extracted transmission is directly used for distribution compression and feature extraction. By other forms, process 300 optionally then may include "adjust transmission distribution values" 328 in order to modify or refine the transmission characteristics of the transmission distribution. Here, process 300 may include "divide transmission range for separate treatment" 330, so that the transmission range is divided (e.g., via thresholding based on transmission range values or based on some suitable zone system) into two or more segments, each of them applying its own different adjustment as desired. Depending on the design goals, the transmission value range can be divided into more than two segments, each segment having its own parameters, or a different function could be applied for a customized adjustment for individual segments.

Whether divided or not, process 300 optionally may include "refine transmission characteristics by filtering" 332. Here, the transmission characteristics may be refined via low-pass filtering (e.g., mean, Gaussian, guided, bilateral, or nonlocal mean filtering) for quality.

Also, process 300 optionally may include "apply tunable content variation parameters" 334. Thus, in yet another example implementation, the transmission is further adjusted via tunable parameters to avoid, for example, excessive corrections in physical regions of an image with none or weak corruption. Such regions of interest also can be identified through thresholding of the transmission values, and the refined transmission values can be obtained, for instance, by applying the scaling and/or offset parameters to the initial transmission values. These regions may or may not correspond to the segmentation mentioned above, and customized functions could also be applied on a region-by-region basis.

Next, process 300 may include "compress and extract features to generate correction factors" 336, where the transmission values of the transmission distribution, whether adjusted or not, are provided for compression, which also results in feature extraction of correction factors. This operation also may include smoothing of the correction factors. The compression and smoothing make feature extraction and correction efficient and robust.

Specifically, two main options are described here, although other options could be used as well. The first option (Option 1) is to use a look-up table (LUT). In this implementation, generally, the signal range is divided into several non-overlapping segments, with uniform or variable lengths, and the average transmission value is calculated for each segment. The signal range refers to a full correction curve that covers all possible image data values of a certain range such as luminance (e.g., 256-entry mapping for an 8-bit signal) and that is divided into segments, such as eight uniformly-sized segments, each comprised of 32 values (i.e., 0-31, 32-63, . . . , 224-255). This process effectively creates a look-up table, with the segment index denoting the input signal range and the average transmission value denoting the output signal range or the correction factor associated with this range. Alternatively, creating the LUTs may involve applying some sampling (e.g., every 16th sample in the transmission distribution) to the full correction curve of the signal range to determine the transmission values (or corresponding correction factors) for each of the sampling points.

In the former case, to form bins for the LUT, process 300 may include "divide signal range of image data values into segments" 338. Process 300 then may include "determine representative transmission for individual segments to form LUT" 339. One implementation of LUT generation is averaging the transmission values in each LUT bin or segment.

Process 300 optionally also may include "apply parameterized curve to representative transmissions" 340. Here, the LUT values are obtained from a parameterized curve explained below in operation 346 to set, replace, or modify the transmission for each segment.

By one approach, process 300 also may include "apply smoothing filter" 341, so that the LUT is subject to smoothing (e.g., mean filtering). After filling all bins with average or interpolated/extrapolated data, LUTs are smoothened between local bins with a moving average manner.

Process 300 may include "provide LUT as the correction factors" 342. The resulting LUT forms, or is, the correction factors representing a haze correction curve or tone mapping-type curve that is applied to the original image after refinement into correction parameters as described below.

The second option (Option 2) is to use a curve fitting function instead of, or in addition to, the LUT. Different methods may be used for different parts of the image. In this example implementation, process 300 may include "normalize transmission values by dividing by luminance values" 344. Here, the distribution of transmission values is compressed and/or normalized (e.g., divided by luminance) and subject to curve fitting using suitable functions, such as the gamma curve, power function, S-shaped functions (for example, sigmoidal), and polynomial functions. Thus, process 300 may include "apply curve fitting function to form parameterized curve" 346. These curves also may be referred to as models (i.e., curve model or parametric correction model). Since curve parametrization can further reduce memory and storage requirements, it is very advantageous when implementing the solution in hardware.

Process 300 then may include "provide parameterized curve as the correction factors" 348. Depending on configuration and implementation requirements, the curve, or in other words, the parametric curve model, can be used to calculate the correction factors or even LUT values as mentioned above, or may be directly used as an input-to output mapping function.

Otherwise, process 300 may include "sample parameterized curve to form a table of correction factors" 350. Thus, the fit curve may be sampled further to obtain the table of correction factors (which also is a type of look-up table), which can be used to obtain the corrected pixel values. Thus, the values in the table will be correction factors (e.g., slope or scale, and offset), and the index to the table values can be luminance or other signal dependent component (which is the same parameter to be extracted from the input pixel values for the de-hazing). Alternatively, this table can be used to select the appropriate correction coefficients based on the actual pixel values or the values of their corresponding signal-depending components in order to apply these coefficients to the original pixel values (e.g., through addition, multiplication, etc., depending on the nature of correction) to produce the corrected output value.

Next, process 300 may include "generate correction parameters" 352, and by one form to estimate the final correction parameters. For this operation when the correction factors of the parameterized curve option will be used directly to correct an image, process 300 may include "temporally filter correction factors for the parameterized curve" 353. Here, temporal filtering (for example, weighted means obtained for two or more frames which may or may not be consecutive) is applied to the parameterized curve (or model) obtained through the curve fitting to avoid temporal fluctuation in video use cases over a number of frames. Alternatively, process 300 also may include "interpolate values for empty bins" 356 and/or "apply filter for smoothing" 358 for the fit curve data as well. The process 300 then proceeds to apply the correction parameters to the hazed image for correction.

Similarly, for the LUT option, the temporal filtering also may be applied to the LUT 354. Then, process 300 may include "interpolate values for empty bins" 356, and "apply filter for smoothing" 358. Thus, in one example implementation, the obtained LUT is subject to smoothing or low-pass filtering along its bins and any empty bin location should be subject to the interpolation prior to this smoothing. Alternatively, "interpolate values for empty bins" 356, and "apply filter for smoothing" 358 may be applied in a single step for better efficiency. These same operations 354, 356 and 358 may be performed when the table of correction factors will be providing the correction parameters instead of the LUT and the parameterized curve directly. By another approach, just operations 356 and 358 are performed with the table of correction factors to form final correction parameters without the temporal filtering.

Thereafter, process 300 may include "apply correction parameters" 360. Finally, the obtained correction factors are used to suppress haze degradations in the input image. For the LUT or table of correction factors (TOCFs) alternatives, process 300 may include "apply LUT or TOCF to individual pixel locations" 362. In this example implementation, the LUT or TOCF is applied to each pixel location of the input image. In this approach, process 300 may include "find closest bins" 364, where an input pixel value is used to find the closest bins or data points in one of the tables, such as two closest bins (or segments) but other number of bins could be used. Then, process 300 may include "use interpolated value from closest bins" 370, so that the system replaces the input pixel value with a value interpolated using a few closest bins, such as first and second closest bins for instance. The generated LUT or TOCF is applied to the original size image. Since the LUT or TOCF represents a correction curve, this process transforms, or converts, hazed image data into non-hazed or corrected image data, similar to the operation of a tone mapping-type curve. In the corrected data, color saturation may be enhanced depending on the degree of haze degradation, correction strength, and other factors.

Regarding the fit curve alternative, process 300 may include "apply parameterized curve model to individual pixel locations" 368, so that a de-hazed output pixel is obtained by applying the parameterized curve model to the input pixel values.

In another example implementation, the input pixel may be combined (e.g., multiplication or averaged) with the correction factor for any of the alternatives.

In yet another example implementation, the correction is applied in pixel locations selected using one or more detection criteria when detection operations were performed to determine which parts of the image had haze as described above.

Figure 4:
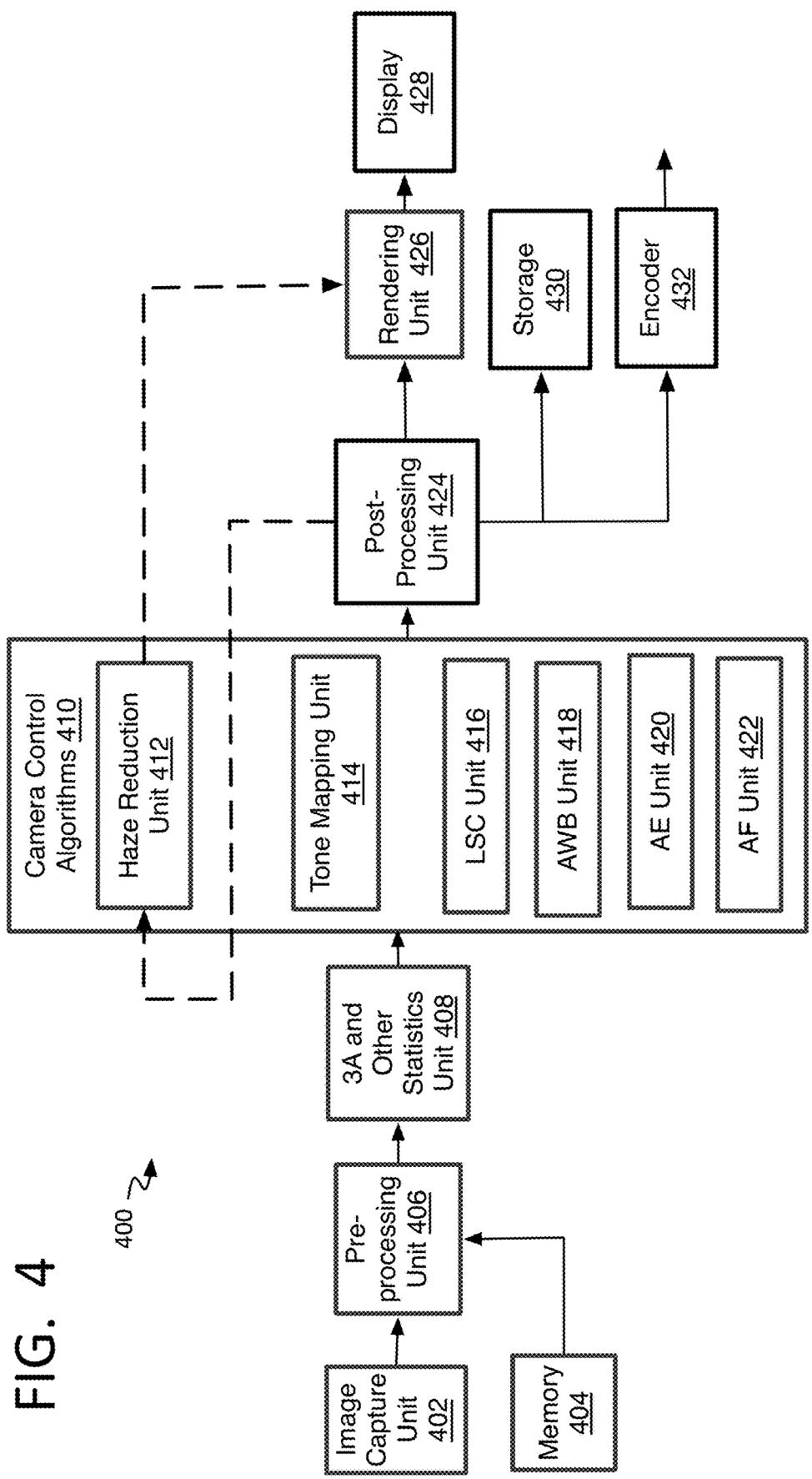
FIG. 4 is a schematic diagram of a system for haze reduction for image processing in accordance with at least one of the implementations herein.

Referring to FIG. 4, an image processing system 400 is provided to show the adaptability of the haze reduction module or unit. Particularly, system 400 has an image capture unit 402 that may include camera hardware to capture images, or may include a camera module that receives raw image data from camera sensors for processing. Memory 404 also may hold previously obtained images. In either case, image data may be provided to a pre-processing unit 406 that performs pre-processing tasks mentioned above and including black level correction, linearization, defective pixel correction, and so forth.

A 3A and other statistics unit 408 analyzes the image data in various states or versions to provide statistics to other camera control algorithms 410 and other modules such as for rendering or encoding so that these modules can perform the required tasks.

Camera control algorithms (CCA) 410 can perform different operations to control or enhance at least one of image capture, image processing, tone mapping, and/or rendering processes. Thus, the CCA 410 may have a haze reduction unit 412, a tone mapping unit 414, an LSC unit 416, and 3A units such as an AWB unit 418, an AE unit 420, and an AF unit 422. After adjustments to the control parameters (e.g., sensor parameters, tone-mapping parameters, etc.) or after image data is generated by these units, a post-processing unit 424 may perform post-processing such as sharpening, scaling, color space conversion and so forth.

After post-processing, the image data may be provided to a rendering unit 426 to format the image data for viewing or visual inspection on a display 428, or to storage 430 for later use, or to an encoder 432 for transmission to another device.

It will be noted here that the haze reduction unit 412 is adaptable and is not limited by the image data modifications that occur before de-hazing operations. Thus, the haze reduction unit 412 could be part of the pre-processing unit, post-processing unit, rendering unit, or some other data processing unit instead. Shown here by dashed arrows, the haze reduction unit 412 could be applied after post-processing is complete as well, as long as pixel-level luminance statistics or other representative pixel image data can be obtained for an image being analyzed for haze removal.

The pre-processing, CCA units, and post-processing unit as well as the others each have at least some tasks that are performed on an ISP as well as software. Such ISP and other hardware blocks may be a part of a shared or fixed function ISP. It will be understood, however, that a CPU and/or other processor(s) could perform such processing rather than, or in addition to, the ISP. The ISP may be part of a system on a chip (SoC) or other architectures.

More relevant here, the haze reduction unit 412 may use the same ISP and hardware as the tone mapping unit 414 because the tone mapping unit 414 and haze reduction unit 412 both use LUTs or input-to-output mapping curves to adjust the image data. This significantly reduces the separate hardware/firmware footprint of the haze reduction unit 412.

Referring to FIGS. 5A-5B, an image 500 shows example results in the form of an input image of a laboratory test scene degraded by haze, while a corrected image 502 shows the results of the present de-hazing methods. This comparison clearly demonstrates that the proposed method effectively suppresses haze effects, while improving image contrast and color accuracy and enhancing the overall information value of the captured images. Moreover, the corrected images are naturally looking and are artifact-free.

Any one or more of the operations of the processes in FIGS. 2 and 3A-3C may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic and/or firmware logic configured to provide the functionality described herein. The software may be embodied as a software package, code and/or instruction set, and/or firmware that stores instructions executed by programmable circuitry. The modules may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

As used in any implementation described herein, the term "engine" and/or "component" may refer to a module or to a logic unit, as these terms are described above. Accordingly, the term "engine" and/or "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 6:
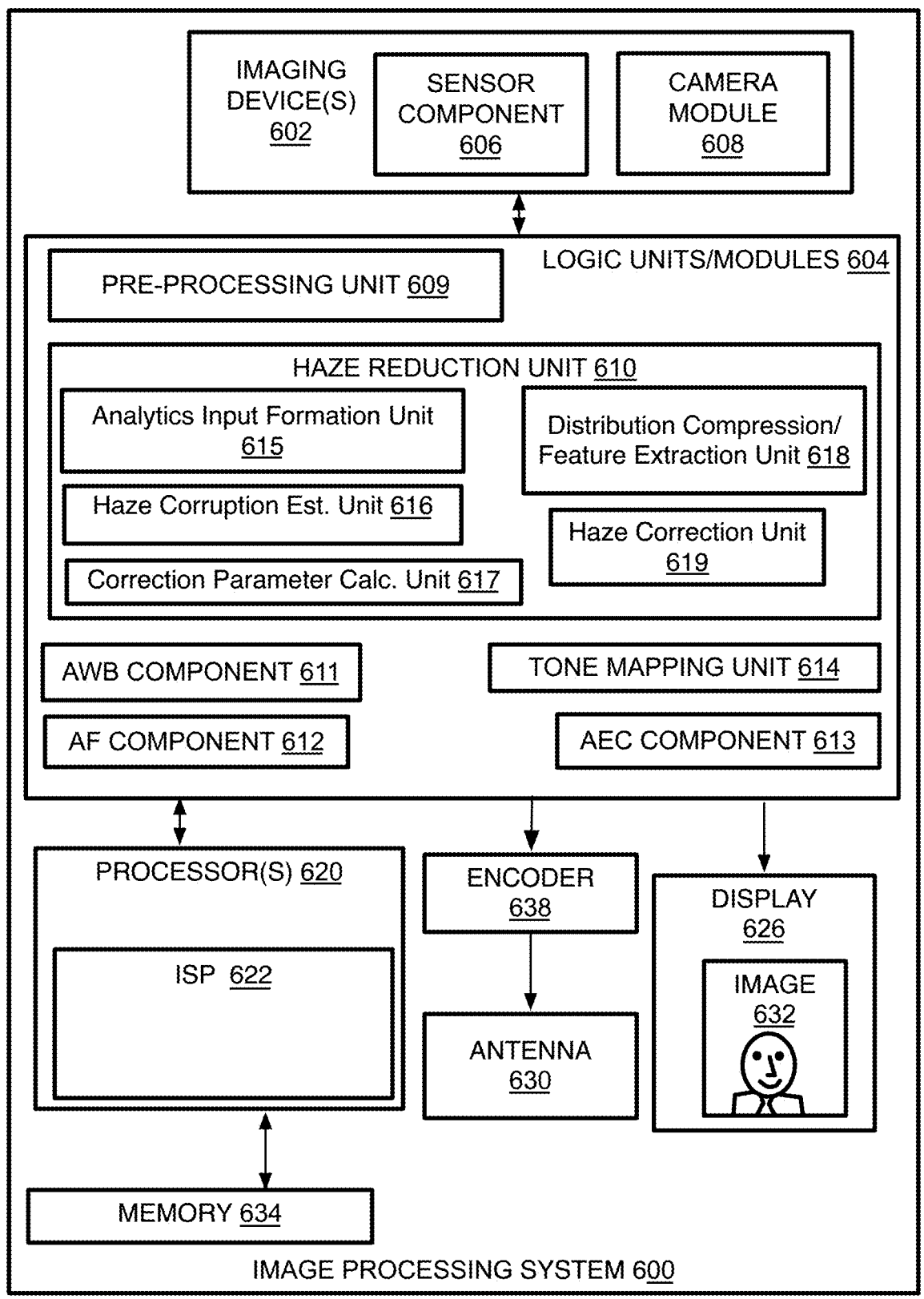
FIG. 6 is an illustrative diagram of an example image processing system.

Referring to FIG. 6, an example image processing system 600 is arranged in accordance with at least some implementations of the present disclosure. In various implementations, the example image processing system 600 may have an imaging device 602 to form or receive captured image data. This can be implemented in various ways. Thus, in one form, the image processing system 600 may be a digital camera or other image capture device, and imaging device 602, in this case, may be the camera hardware and camera sensor software, module, or component. In other examples, imaging processing system 600 may have an imaging device 602 that includes or may be a camera, and logic modules 604 may communicate remotely with, or otherwise may be communicatively coupled to, the imaging device 602 for further processing of the image data.

In either case, such technology may include a camera such as a digital camera system, a dedicated camera device, or an imaging phone, whether a still picture or video camera or some combination of both. Thus, in one form, imaging device 602 may include camera hardware and optics including one or more sensors as well as auto-focus, zoom, aperture, neutral density (ND) filter, auto-exposure, flash, and actuator controls. These controls may be part of a sensor module or component 606 for operating the sensor. The sensor component 606 may be part of the imaging device 602, or may be part of the logical modules 604 or both. Such sensor component can be used to generate images for a viewfinder and take still pictures or video. The camera hardware and camera sensor software is provided by the camera module or component 608. The imaging device 602 also may have a lens, an image sensor with a RGB Bayer color filter or other types of filters as mentioned herein, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor also may support other types of electronic shutters, such as global shutter in addition to, or instead of, rolling shutter, and many other shutter types as long as a multi-frame statistics gathering window can be used. In some examples, imaging device 602 may be provided with an eye tracking camera.

In the illustrated example, the logic modules 604 may include a pre-processing unit 609, a haze reduction (or de-hazing) unit 610 as well as an automatic white balancing (AWB) control or component 611, an automatic focus (AF) component 612, an automatic exposure control (AEC) module or component 613, and a tone mapping unit 614. The de-hazing unit 610 may have an analytics input formation unit 615, haze corruption estimation unit 616, correction parameter calculation unit 617, distribution compression/feature extraction unit 618, and a haze correction unit 619, where each unit performs the tasks suggested by the name of the unit and as described above. The logic modules 604 may be communicatively coupled to the imaging device 602 in order to receive the raw image data from the camera described herein. Otherwise, memory 634 may be provided to store the image data in a buffer for example, where the memory is formed of RAM such as DRAM, cache, or other memory.

The image processing system 600 may have one or more of the processors 620 which may include a dedicated or fixed function image signal processor (ISP) 622 such as the Intel Atom, one or more DSPs, or other processors, memory 634, one or more displays 626, encoder 638, and antenna 630. In one example implementation, the image processing system 600 may have the display 626, at least one processor 620 communicatively coupled to the display, at least one memory 634 communicatively coupled to the processor and having the buffer 636 or other memories by one example for storing 3A and other statistics data, descriptor code order, and/or single frame indices. The encoder 638 and antenna 630 may be provided to compress the modified image date for transmission to other devices that may display or store the image. It will be understood that the image processing system 600 may also include a decoder (or encoder 638 may include a decoder) to receive and decode image data for processing by the system 600. Otherwise, the processed image 632 may be displayed on display 626 or stored in memory 634. As illustrated, any of these components may be capable of communication with one another and/or communication with portions of logic modules 604 and/or imaging device 602. Thus, processors 620 may be communicatively coupled to both the image device 602 and the logic modules 604 for operating those components. By one approach, although image processing system 600, as shown in FIG. 6, may include one particular set of blocks or actions associated with particular components or modules, these blocks or actions may be associated with different components or modules than the particular component or module illustrated here.

Referring to FIG. 7, an example system 700 in accordance with the present disclosure operates one or more aspects of the image processing system described herein. It will be understood from the nature of the system components described below that such components may be associated with, or used to operate, certain part or parts of the image processing system described above. In various implementations, system 700 may be a media system although system 700 is not limited to this context. For example, system 700 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716, and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, Display Port, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In implementations, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In implementations, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various implementations, platform 702 and display 720 may be an integrated unit. Display 720 and content service device(s) 730 may be integrated, or display 720 and content delivery device(s) 740 may be integrated, for example. These examples are not meant to limit the present disclosure.

In various implementations, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 7.

Figure 8:
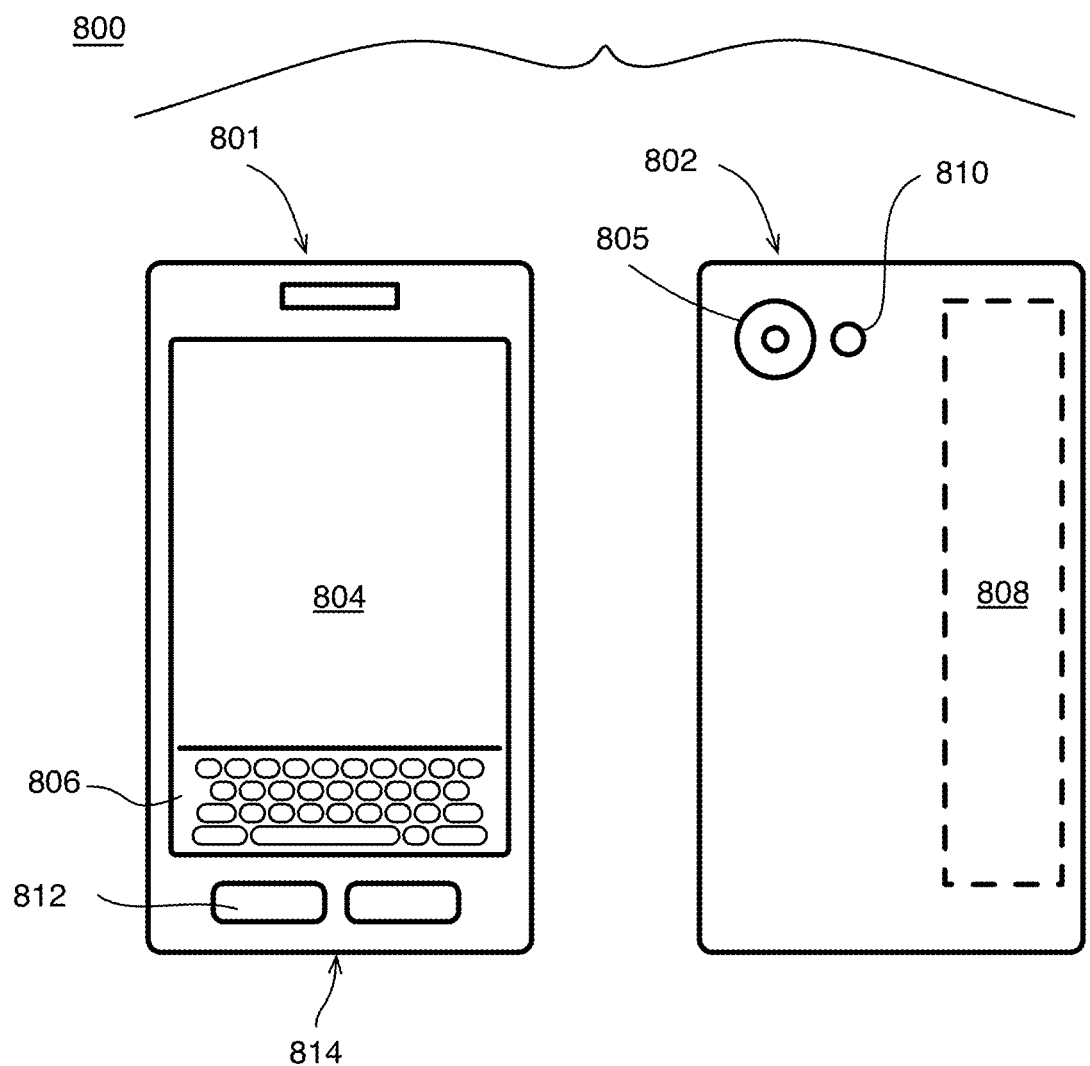
FIG. 8 is an illustrative diagram of an example system, all arranged in accordance with at least some implementations of the present disclosure.

Referring to FIG. 8, a small form factor device 800 is one example of the varying physical styles or form factors in which systems 600 or 700 may be embodied. By this approach, device 800 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 8, device 800 may include a housing with a front 801 and a back 802. Device 800 includes a display 804, an input/output (I/O) device 806, and an integrated antenna 808. Device 800 also may include navigation features 812. I/O device 806 may include any suitable I/O device for entering information into a mobile computing device. Examples for I/O device 806 may include an alphanumeric keyboard, a numeric keypad, a touch pad, input keys, buttons, switches, microphones, speakers, voice recognition device and software, and so forth. Information also may be entered into device 800 by way of microphone 814, or may be digitized by a voice recognition device. As shown, device 800 may include a camera 805 (e.g., including at least one lens, aperture, and imaging sensor) and a flash 810 integrated into back 802 (or elsewhere) of device 800. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations. In the implementations below and in the claims, the term "at least one of:" for a list of A and B refers to at least one of A or at least one of B or at least both A and B.

The following examples pertain to further implementations. In the implementations below and in the claims, the term "at least one of:" for a list of A and B refers to at least one of A or at least one of B or at least both A and B.

By an example first implementation, a computer-implemented method of haze reduction for image processing comprises obtaining image data of at least one image with haze obscuring content of the image; determining a haze corruption estimation comprising: determining at least one atmospheric light (airlight) value at least partly based on the image data; and determining a medium transmission distribution of transmission values for individual pixels by using the airlight value; compressing the transmission distribution to form correction factors; determining correction parameters by refining the correction factors; and applying the correction parameters to a version of the pixel data of the at least one image to reduce haze in the image.

Further to the first implementation, wherein obtaining the image data comprises obtaining at least one of: a down-sampled version of the image, and one or more selected areas of the image that is less than the entire image.

Further to the first implementation, wherein the haze corruption estimation is applied to at least one area of the at least one image with previously detected haze and that is less than the entire image.

Further to the first implementation, wherein the airlight value is computed by using at least one of: combining image data of darkest unsaturated pixels in the entire image, combining image data of darkest pixels from a plurality of local pixel neighborhoods, and combining local airlight estimates from the one or more areas of the image being analyzed for haze reduction.

Further to the first implementation, wherein determining the transmission values comprises using a minimum ratio between pixel intensities or their luminance components inside a local neighborhood and the airlight value.

Further to the first implementation wherein determining the transmission values comprises using a minimum ratio between pixel intensities or their luminance components inside a local neighborhood and the airlight value, and the comprises adjusting the ratio by a parameter; dividing the transmission values to one or more segments; and separately adjusting the transmission values in each segment by using tunable parameters.

Further to the first implementation wherein compressing the transmission distribution to form correction factors comprises performing feature extraction on the transmission distribution so that there are fewer correction factors than transmission values in the transmission distribution and without losing the ability to apply the correction parameters to image data of individual pixel locations separately from other pixel locations.

Further to the first implementation, wherein compressing the transmission distribution to form correction factors comprises fitting a curve to the transmission distribution to obtain a parametric correction model used as an input-to-output mapping function with haze correction capabilities, to form a table of correction parameters or to form a look-up table or any combination of these.

Further to the first implementation, wherein compressing the transmission distribution to form correction factors comprises dividing the transmission distribution into multiple segments to obtain per-segment correction parameters or per-segment correction mapping with correction capabilities.

Further to the first implementation, wherein determining correction parameters by refining the correction factors comprises applying at least one of: interpolation to obtain missing values or to replace values in a look-up table or a table of correction factors, and low-pass filtering to enhance per frame or per image correction factors.

Further to the first implementation, wherein determining correction parameters by refining the correction factors comprises temporal filtering to suppress oscillations or abrupt changes in estimates obtained from a plurality of frames.

Further to the first implementation, the method also comprises applying the correction parameters to non-downsampled image data to reduce the haze of the at least one image even though the correction parameters were determined based at least in part on either (a) downsampled image data, or (b) one or more selected areas of the at least one image that are less than the entire image.

By an example second implementation, a computer-implemented system of image processing comprises at least one image capture device to capture at least one image with haze obscuring content of the image; memory communicatively coupled to at least one processor and storing image data of the at least one image; and at least one processor communicatively coupled to the at least one image capture device and memory, and the at least one processor to operate by: obtaining image data of at least one image with haze obscuring content of the image; determining a haze corruption estimation comprising: determining at least one atmospheric light (airlight) value at least partly based on the image data; and determining a medium transmission distribution of transmission values for individual pixels by using the airlight value; compressing the transmission distribution to form correction factors; determining correction parameters by refining the correction factors; and applying the correction parameters to a version of the pixel data of the at least one image to reduce haze in the image.

Further to the second implementation, wherein determining the transmission values comprises using a minimum ratio between pixel intensities or their luminance components inside a local neighborhood and the airlight value.

Further to the second implementation, wherein determining the haze corruption estimation and compressing the transmission distribution involves using estimates of the airlight, the transmission values, and observed intensity of the image data to determine a function of scene radiance with per pixel image data as the input for the function to perform spatially invariant correction of the image data with haze corruption.

Further to the second implementation, wherein determining the haze corruption estimation and compressing the transmission distribution involves using estimates of the airlight, the transmission values, and observed intensity of the image data to determine a function of scene radiance with per pixel image data as the input for the function to perform spatially invariant correction of the image data with haze corruption, and wherein the function is in the form of a look-up table (LUT), a parameterized curve, or a table of correction factors based at least in part on data of the parameterized curve.

Further to the second implementation, wherein the compressing comprises at least one of: (1) normalizing the transmission values by dividing the transmission values by luminance values to generate normalized transmission values used to form a parameterized curve that provides the correction factors, (2) dividing a range of possible image data values into segments, and computing a representative transmission value for each of the segments to obtain one or more correction factors.

Further to the second implementation, wherein the compressing comprises using curve fitting applied to the transmission values to form a parameterized curve, determining and sampling the parameterized curve to output correction factors, and using the correction factors to generate a look-up table (LUT) or a table of correction factors to reduce the number of correction factors stored in the look-up table or the table for correction factors.

Further to the second implementation, wherein determining correction parameters by refining the correction factors comprises applying at least one of: (a) interpolation to obtain missing values or replace outlying values in a look-up table or a table of correction factors, (b) low-pass filtering to enhance per frame or per image correction factors, and (c) temporal filtering to suppress oscillations or abrupt changes in estimates obtained from a plurality of frames.

As an example third implementation, at least one non-transitory computer-readable comprising a plurality of instructions stored thereon that in response to being executed on a computing device, cause the computing device to operate by: obtaining image data of at least one image with haze obscuring content of the image; determining a haze corruption estimation comprising: determining at least one atmospheric light (airlight) value at least partly based on the image data; and determining a medium transmission distribution of transmission values for individual pixels by using the airlight value; compressing the transmission distribution to form correction factors; determining correction parameters by refining the correction factors; and applying the correction parameters to a version of the pixel data of the at least one image to reduce haze in the image.

Further to the third implementation, wherein compressing the transmission distribution to form correction factors comprises fitting a curve to the transmission distribution to obtain: (a) a parametric correction model, (b) an input-to-output mapping with haze correction capabilities, (c) a table of correction parameters, or (d) any combination of (a) to (c).

Further to the third implementation, wherein compressing the transmission distribution to form correction factors comprises dividing the transmission distribution to multiple segments to obtain per-segment correction parameters or mapping with correction capabilities.

Further to the third implementation, wherein determining correction parameters by refining the correction factors comprises applying at least one of: (a) interpolation to obtain missing values or replace outlying values in a look-up table or a table of correction factors, (b) low-pass filtering to enhance per frame or per image correction factors, and (c) temporal filtering to suppress oscillations or abrupt changes in estimates obtained for different frames.

Further to the third implementation, wherein the correction parameters are applied to non-downsampled image data to reduce the haze of the at least one image even though the correction parameters were determined based at least in part on downsampled image data or image data of selected areas of the at least one image that is less than the entire image.

Further to the third implementation, wherein the instructions cause the computing device to operate by: finding the closest bins of a look-up table or a table of correction factors forming the correction parameters and closest to an input image data value of an input pixel location; interpolating a revised image data value or a revised correction coefficient for the input image data value; and either replacing the input image data value with the revised image data value or combining the input image data value and the revised correction coefficient value to form a haze-reduced image data value for the pixel location.

In a further example, at least one non-transitory machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of image processing, comprising:
    obtaining image data of at least one image with haze obscuring content of the image;
    determining a haze corruption estimation comprising:
        determining at least one atmospheric light (airlight) value at least partly based on the image data; and
        determining a medium transmission distribution of transmission values for individual pixels by using the airlight value;
    compressing the transmission distribution to form correction factors so that there are fewer correction factors than transmission values in the transmission distribution;
    determining correction parameters by refining the correction factors; and
    applying the correction parameters to a version of the pixel data of the at least one image to reduce haze in the image.

2. The method of claim 1 wherein obtaining the image data comprises obtaining at least one of:
    a downsampled version of the image, and
    one or more selected areas of the image that is less than the entire image.

3. The method of claim 1 wherein the haze corruption estimation is applied to at least one area of the at least one image with previously detected haze and that is less than the entire image.

4. The method of claim 1 wherein the airlight value is computed by using at least one of: combining image data of darkest unsaturated pixels in the entire image, combining image data of darkest pixels from a plurality of local pixel neighborhoods, and combining local airlight estimates from the one or more areas of the image being analyzed for haze reduction.

5. The method of claim 1 wherein determining the transmission values comprises using a minimum ratio between pixel intensities or their luminance components inside a local neighborhood and the airlight value.

6. The method of claim 5 comprising adjusting the ratio by a parameter; dividing the transmission values to one or more segments; and separately adjusting the transmission values in each segment by using parameters that can be different from segment to segment.

7. The method of claim 1 wherein compressing the transmission distribution to form the fewer correction factors than the transmission values is feature extraction on the transmission distribution without losing the ability to apply the correction parameters to image data of individual pixel locations separately from other pixel locations.

8. The method of claim 1 wherein compressing the transmission distribution (A) to form correction factors comprises fitting a curve to the transmission distribution to obtain a parametric correction model used as an input-to-output mapping function with haze correction capabilities, (B) to form a table of correction parameters, or (C) to form a look-up table, or (D) any combination of these.

9. The method of claim 1 wherein compressing the transmission distribution to form correction factors comprises dividing the transmission distribution into multiple segments to obtain per-segment correction parameters or per-segment correction mapping with correction capabilities.

10. The method of claim 1 wherein determining correction parameters by refining the correction factors comprises applying at least one of:
    interpolation to obtain missing values or to replace values in a look-up table or a table of correction factors, and
    low-pass filtering to enhance per frame or per image correction factors.

11. The method of claim 1 wherein determining correction parameters by refining the correction factors comprises temporal filtering to suppress oscillations or abrupt changes in estimates obtained from a plurality of frames.

12. The method of claim 1 comprising applying the correction parameters to non-downsampled image data to reduce the haze of the at least one image even though the correction parameters were determined based at least in part on either (a) downsampled image data, or (b) one or more selected areas of the at least one image that are less than the entire image.

13. A computer-implemented system of image processing, comprising:
    memory storing image data of at least one image with haze obscuring content; and
    at least one processor communicatively coupled to the memory, and the at least one processor to operate by:
        obtaining image data of at least one image with haze obscuring content of the image;
        determining a haze corruption estimation comprising:
            determining at least one atmospheric light (airlight) value at least partly based on the image data; and
            determining a medium transmission distribution of transmission values for individual pixels by using the airlight value;
        compressing the transmission distribution to form correction factors comprising using airlight values, the transmission values, and observed intensity of the image data to determine a function of scene radiance with per pixel image data as the input for the function to perform spatially invariant correction of the image data with haze corruption;
        determining correction parameters by refining the correction factors; and
        applying the correction parameters to a version of the pixel data of the at least one image to reduce haze in the image.

14. The system of claim 13 wherein determining the transmission values comprises using a minimum ratio between pixel intensities or their luminance components inside a local neighborhood and the airlight value.

15. The system of claim 13 wherein the function is in the form of a look-up table (LUT), a parameterized curve, or a table of correction factors based at least in part on data of the parameterized curve.

16. The system of claim 13 wherein the compressing comprises at least one of:
    (1) normalizing the transmission values by dividing the transmission values by luminance values to generate normalized transmission values used to form a parameterized curve that provides the correction factors, (2) dividing a range of possible image data values into segments, and computing a representative transmission value for each of the segments to obtain one or more correction factors.

17. The system of claim 13 wherein the compressing comprises using curve fitting applied to the transmission values to form a parameterized curve, determining and sampling the parameterized curve to output correction factors, and using the correction factors to generate a look-up table (LUT) or a table of correction factors.

18. The system of claim 13 wherein determining correction parameters by refining the correction factors comprises applying at least one of: (a) interpolation to obtain missing values or replace outlying values in a look-up table or a table of correction factors, (b) low-pass filtering to enhance per frame or per image correction factors, and (c) temporal filtering to suppress oscillations or abrupt changes in estimates obtained from a plurality of frames.

19. At least one non-transitory article having at least one computer readable medium comprising a plurality of instructions stored thereon that in response to being executed on a computing device, cause the computing device to operate by:
obtaining image data of at least one image with haze obscuring content of the image;
determining a haze corruption estimation comprising:
determining at least one atmospheric light (airlight) value at least partly based on the image data; and
determining a medium transmission distribution of transmission values for individual pixels by using the airlight value;
compressing the transmission distribution to form correction factors comprising dividing the transmission distribution to multiple segments to obtain per-segment correction parameters or mapping with correction capabilities;
determining the correction parameters by refining the correction factors; and
applying the correction parameters to a version of the pixel data of the at least one image to reduce haze in the image.

20. The article of claim 19 wherein compressing the transmission distribution to form correction factors comprises fitting a curve to the transmission distribution to obtain:
(a) a parametric correction model,
(b) an input-to-output mapping with haze correction capabilities,
(c) a table of correction parameters, or
(d) any combination of (a) to (c).

21. The article of claim 19 wherein determining correction parameters by refining the correction factors comprises applying at least one of: (a) interpolation to obtain missing values or replace outlying values in a look-up table or a table of correction factors, (b) low-pass filtering to enhance per frame or per image correction factors, and (c) temporal filtering to suppress oscillations or abrupt changes in estimates obtained for different frames.

22. The article of claim 19 wherein the correction parameters are applied to non-downsampled image data to reduce the haze of the at least one image even though the correction parameters were determined based at least in part on downsampled image data or image data of selected areas of the at least one image that is less than the entire image.

23. The article of claim 19 wherein the instructions cause the computing device to operate by:
finding the closest bins of a look-up table or a table of correction factors forming the correction parameters and closest to an input image data value of an input pixel location;
interpolating a revised image data value or a revised correction coefficient for the input image data value; and
either replacing the input image data value with the revised image data value or combining the input image data value and the revised correction coefficient value to form a haze-reduced image data value for the pixel location.

* * * * *